United States Patent
Pierrot et al.

(10) Patent No.: US 10,302,470 B2
(45) Date of Patent: May 28, 2019

(54) SYSTEM FOR MEASURING AN OIL RETENTION VOLUME IN A LUBRICATING SYSTEM

(71) Applicant: SNECMA, Paris (FR)

(72) Inventors: Arnaud Jean-Marie Pierrot, Le Mee sur Seine (FR); Serge René Morreale, Guignes (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 283 days.

(21) Appl. No.: 14/649,411

(22) PCT Filed: Dec. 3, 2013

(86) PCT No.: PCT/FR2013/052921
§ 371 (c)(1),
(2) Date: Jun. 3, 2015

(87) PCT Pub. No.: WO2014/087090
PCT Pub. Date: Jun. 12, 2014

(65) Prior Publication Data
US 2015/0316398 A1     Nov. 5, 2015

(30) Foreign Application Priority Data

Dec. 3, 2012  (FR) ..................... 12 61570

(51) Int. Cl.
*G01F 1/00*    (2006.01)
*F01D 25/18*   (2006.01)
(Continued)

(52) U.S. Cl.
CPC .............. *G01F 1/00* (2013.01); *F01D 25/18* (2013.01); *F16N 7/40* (2013.01); *F16N 29/00* (2013.01);
(Continued)

(58) Field of Classification Search
CPC ... G01F 1/00; F01D 25/18; F16N 7/40; F16N 29/00
(Continued)

(56) References Cited

U.S. PATENT DOCUMENTS 4,013,953 A    3/1977 Skala
5,635,625 A *  6/1997 Tsunoda ............. F01M 11/0458
                                                  123/196 R
(Continued)

FOREIGN PATENT DOCUMENTS

JP    2003-020924 A    1/2003
WO    WO 91/18280 A1   11/1991
(Continued)

OTHER PUBLICATIONS

International Search Report as issued in International Patent Application No. PCT/FR2013/052921, dated Apr. 10, 2014.
(Continued)

*Primary Examiner* — Son T Le
*Assistant Examiner* — Alexander A Mercado
(74) *Attorney, Agent, or Firm* — Pillsbury Winthrop Shaw Pittman LLP

(57) ABSTRACT

A system for measuring an oil retention volume of a first member of an engine lubricating system, the injected oil flowing inside the first member mixed with a first air volume, the mixture forming a first fluid, the measuring system including an oil injector at the inlet of the lubricating system; a first flowmeter to measure a first oil flow rate at the inlet of the lubricating system; a second flowmeter at the outlet of the first member to measure a second flow rate of the first fluid at the outlet of the first member; a measuring device to calculate a first value representing a quantity of oil in a volume of the first fluid flowing inside the first member; a calculator to calculate a third oil flow rate at the outlet from
(Continued)

the second flow rate of the first fluid measured and the first value calculated and the instantaneous oil retention volume in the first member from the comparison of the first oil flow rate with the third oil flow rate.

12 Claims, 3 Drawing Sheets

(51) Int. Cl.
*F16N 7/40* (2006.01)
*F16N 29/00* (2006.01)

(52) U.S. Cl.
CPC ...... *F16N 2250/18* (2013.01); *F16N 2250/40* (2013.01)

(58) Field of Classification Search
USPC .................................. 73/114.55, 19.11, 196
See application file for complete search history.

(56) References Cited

U.S. PATENT DOCUMENTS

| 5,922,969 | A |   | 7/1999 | Haar |
| 6,076,049 | A | * | 6/2000 | Lievois ............. G01N 33/2823 324/637 |
| 2009/0216463 | A1 | * | 8/2009 | Xie ..................... G01N 21/314 702/24 |

FOREIGN PATENT DOCUMENTS

| WO | WO 99/36772 A1 | 7/1999 |
| WO | WO 01/36861 A1 | 5/2001 |

OTHER PUBLICATIONS

Kral: Ship Upgrade with KRAL Pumps and Flowmeters for the Marine, Sep. 2011, pp. 29-34, <http://www.kral.at/uploads/media/KRAL_Ship_Upgrade_01.pdf>.

* cited by examiner

SYSTEM FOR MEASURING AN OIL RETENTION VOLUME IN A LUBRICATING SYSTEM

CROSS REFERENCE TO RELATED APPLICATIONS

This application is the U.S. National Stage of PCT/FR2013/052921, filed Dec. 3, 2013, which in turn claims priority to French Patent Application No. 1261570 filed Dec. 3, 2012, the entire contents of all applications are incorporated herein by reference in their entireties.

FIELD

The present invention relates to the technical field of lubrication systems of mechanical members for engines. More specifically, the field of the invention relates to oil systems of a turbomachine and the calculation of oil retention volumes of different members distributed in the lubricating system.

Therefore, the field of the invention concerns all lubricated mechanical systems for which oil retention volumes are desired to be measured and/or calculated, in particular for calibrating and adapting the inflow and outflow oil rates, and for optimizing the design of mechanical parts in order to reduce their mass in use.

STATE OF THE ART

There are oil lubricating systems in numerous systems generally requiring rotational movements of mechanical parts connected to each other by links enabling a strain to be transferred from one part to the other. One purpose, upon designing mechanical parts, is to ensure a satisfactory oil passage through the system so as to avoid too high oil retention. The latter results in increasing the mass and size of the equipments (oil tank in particular).

This is especially the case for numerous types of engines and more particularly of aircraft engines subjected to flight conditions imposing high requirements in designing the parts used.

In a turbomachine, the oil system enables different mechanical members such as enclosures, which contain bearings, which support the rotating shafts, in particular between the stator part and the rotor part, or between two rotor parts of a turbojet engine, or accessory boxes, to be lubricated and cooled. Among the latter, there is particularly AGB ("Accessory Gear Box"), which comprises, among other things, fuel tanks and oil pumps. There is also the TGB ("Transfer Gear Box") which is a transmission box between the radial shaft of the engine and the AGB.

One feature in the aeronautical field is that the design of members and systems is made such that their on-board mass is minimum. Indeed, the latter is fuel consuming and represents an extra cost upon operating the engine.

One problem of a lubricating system is that it comprises members the geometry or design of which does not enable 100% of the oil injected to be circulated. That is a certain oil proportion, called retention oil, is retained in each of the members of the lubricating system. The quantity of retained oil depends on the nature of the member it traverses, such as for example its geometry or materials. Oil retention can have different causes depending on the operating mode of the engine.

Concretely, the oil stored in a tank is sent to different branches of the feed system of the lubricating system using a feed pump. In particular, it feeds the enclosures, the AGB and TGB boxes, and it is scavenged by scavenge pumps at the outlet of each branch of the scavenge system.

Upon starting up the turbomachine, part of the oil is retained in the lubricating system. This results in an almost instantaneous drop of the oil level in the tank upon starting: this is called "gulping".

Upon starting, oil is retained in the members for several reasons:
the conduits are being filled with oil. Indeed, at standstill, the conduits are filled with air and in use, they are filled with oil. The oil volume is readily measurable because the dimensions of the conduits are known.
Part of the oil is vaporized under the operating conditions of the engine. Indeed, this phenomenon is known as oil mist and occurs in the enclosures where part of the oil is vaporized in use and does not return to the tank.
Adhesion to walls. In this case, a quantity of oil adhering to the walls does not return to the tank, in particular because of its viscosity.
Geometry of the mouths. Retentions in the cavities, in particular at mouths, under attitude effects can cause retention.

It is possible to take into account the total volume retained in the lubricating system by comparing the outlet volume to the inlet volume. The oil level drop allows to measure the overall retention volume of all the members including mainly enclosures and boxes, but it does not enable the retention volume peculiar to each member to be known.

Therefore, it is impossible to learn a lesson from one member in particular regarding the oil retention volume in the latter since no measuring means enables the accurate quantity of retained oil to be obtained.

One of the problems is that each member, by its geometry, operating conditions, and design is traversed by a fluid which is a mixture of air and oil the retained quantity of oil only is desired to be known.

One difficulty is that the mixture takes different forms (gas, liquid, or both) depending on the members traversed. On the other hand, oil and air proportions in the fluid can be different from one member to the other.

Finally, since each member has a different behaviour according to the operating conditions, the measuring operation can be made difficult.

Another problem is that the system generally comprises a pump which sucks part of the oil from the lubricating system to promote flow thereof and hence, the sucked oil comprises a further air part resulting from the overdimensioned suction force of the oil in the system.

Upon designing the mechanical parts, called members, of the lubricating system of an engine, it is important to test, by means of a test bench, oil flow in the system to deduce the retained volume thereof. This operation enables data on the nature of the members and the operations to be conducted to improve their design, in particular to reduce the mass of the assembly formed by the member and the retained oil in use, to be collected. But, no solution in prior art seems to take account of this design at the member tested.

SUMMARY OF THE INVENTION

The invention enables the aforesaid drawbacks to be solved.

An object of the invention relates to a measuring device enabling a first value to be calculated at a given instance representing a quantity of oil in a given volume of first fluid, said first fluid being a mixture of a volume of oil and of a first air volume. The measuring device is suitable for correcting, from the first calculated value, the flow measurement of a flowmeter which measures a volume of oil at the outlet of a member of a lubricating system of an engine.

This correction may be an operation carried out by applying a correction factor to the oil flow-rate measurement at the outlet of the flowmeter.

Advantageously, a measuring device further comprises an emitter of a light beam traversing the first fluid passing through the member and a photosensor enabling the quantity of received light to be measured.

Advantageously a measuring device comprises a conduit including at least one translucent portion for conveying the first fluid through the optical device.

Advantageously a measuring device comprises memory enabling the storage, for different outlet flows of a first member, of calibration values, enabling reference values of a response of the photosensor to be associated with a set of reference mixtures of the first fluid, each mixture comprising different air proportions.

Another object of the invention relates to a flowmeter intended to be provided at the outlet of a first member of a lubricating system of an engine. The flowmeter enables a second flow rate of a first fluid passing through the first member to be measured. The first fluid is a mixture of a volume of oil and of a first air volume. The flowmeter (DB2) comprises a measuring device, said flowmeter comprising in addition a calculator allowing a third oil flow rate at the outlet of the first member to be deduced from the second measured flow rate of the first fluid and the first value calculated by the measuring device.

Another object of the invention relates to a system for measuring an oil retention volume of at least one first member of a lubricating system of an engine, the injected oil flowing inside the first member mixed with a first air volume, the mixture forming a first fluid.

Further, the measuring system comprises:
an oil injector at the inlet of the lubricating system to feed said system and;
a first flowmeter enabling a first oil flow rate to be measured at the inlet of the lubricating system and;
a second flowmeter provided at the outlet of the first member, said second flowmeter enabling a second flow rate representing a flow rate of the first fluid at the outlet of the first member to be measured at a given instant;
a measuring device enabling a first value to be calculated at a given instant representing a quantity of oil in a given volume of the first fluid flowing inside said first member;
a calculator enabling to deduce:
a third oil flow rate at the outlet of the first member from the second flow rate of the first fluid measured and the first value calculated;
the instantaneous oil retention volume in the first member from the comparison of the first oil flow rate with the third oil flow rate.

The purpose of the invention is to provide a system for measuring an oil retention volume of a lubricating system including at least one member, the system enabling the retention volume of each member of said system to be known. This datum enables thereafter the validation of specifications produced in a design phase during development tests to optimize the mass of turbojet engines.

One of the advantages of the invention is to have a sensor enabling a quantity of oil, in mass for example, to be directly measured, in the fluid for a given volume at the outlet of a member.

According to one embodiment, the first fluid is a mixture of air and oil. The invention enables different mixtures to be treated, but this embodiment takes account of the field of the invention wherein oil and air are mixed according to different states in the engine.

In one embodiment, the second flowmeter is a scavenge pump dimensioned to avoid overload of a member of the lubricating system by determining a maximum air proportion admissible in the first fluid. It could also be a simple flowmeter at the outlet of a member. In this embodiment, the flowmeter enables different functions to be ensured such as measuring a flow rate but also pumping the fluid traversing the member. According to one embodiment, the pumping properties can be configured depending on the fluid, its volume, the desired flow velocity or even the nature of the member.

According to an improved embodiment, the device is an optical device comprising an emitter emitting a light beam traversing the first fluid flowing inside the member and a photosensor enabling the quantity of received light to be measured.

This solution can be readily implemented. Further, it enables to overcome the system vibrations or electromagnetic stresses which can sometimes be generated when a Coriolis flowmeter or respectively an electromagnetic flowmeter is used. Further, an optical sensor enables a good accuracy to be achieved and can be adapted to numerous configurations. In particular, thanks to the calibration data which are compared to the data collected by the sensor, the system of the invention enables several possible configurations to be taken into account.

In order to be compatible with the optical measuring device, the system comprises a conduit including at least one translucent portion for conveying the first fluid through the optical device. This property has the advantage to be simply implemented through a standard part readily adaptable to known conduits. The emitter and the optical sensor can be simply provided on either side of the conduit.

Advantageously, the translucent portion of the conduit includes an oblong-shaped section which enables to have a homogeneous surface on either side of the translucent conduit. These homogeneous surfaces enable values sensed on a sufficient area of the sensor to be obtained and which are representative of data relating to the oil proportion in the fluid.

In one embodiment, a memory enables the storing, for different outflow rates of the first member, of calibration values, enabling reference values of a response of the photosensor to be associated with a set of mixtures of a first reference fluid, each mixture comprising different air proportions.

One advantage is that the calibration is readily feasible with different characterized oil mixtures in the fluid. Light sensings made during calibration enable, for a given flow rate, a ratio of the quantity of oil contained in the fluid to be associated with a light level or a parameter of light waves such as phase, polarization, or wavelength.

Advantageously, the lubricating system comprises a plurality of members traversed by a plurality of fluids having different oil and air proportions at a given instant. The system comprises, in this case, for each member traversed by a fluid from the injector, a first flowmeter, a second flowmeter, and an optical device as previously defined.

In each branch, the previous elements are arranged such that the retention volumes of each member are calculated according to a measuring system as previously defined. The oil retention volume of the lubricating system is then calculated by summing each of said retention volumes of each member.

The object of the invention also relates to a method for measuring a resident oil volume in a member of a lubricating system of an engine, said member being traversed by a fluid comprising a mixture of oil and air.

Further, the method comprises:
injecting an oil volume at the inlet of said member by means of an injector;
measuring the inflow rate of the oil volume in said member by means of a first flowmeter;
generating a light beam through a translucent portion of a conduit conveying the fluid at the outlet of the member by means of an emitter;
receiving the generated signal on a sensor, having traversed the conduit conveying the fluid;
comparing the signal received with a table of calibration values taking into account different oil proportions in a reference fluid by means of a calculator, said fluid comprising a mixture of air and oil, the values being stored in a memory;
measuring the flow rate of the fluid at the outlet of the member by means of a second flowmeter;
calculating the quantity of oil in a given volume of fluid outflowing from the member;
calculating the resident oil volume in the member.

The invention also relates to a method for measuring a resident oil volume in a lubricating system of an engine, said system comprising a plurality of members each being traversed by a fluid injected by an injector, said fluid comprising a mixture of oil and air, the resident volume in each member being calculated according to the method previously described. The method further comprises calculating a resident oil volume in the lubricating system by summing the resident oil volumes in each of said members.

BRIEF DESCRIPTION OF THE FIGURES

Further characteristics and advantages of the invention will appear upon reading the detailed description that follows, in reference to the appended figures, which illustrate.

DESCRIPTION

In the following description, the notions "oil flow rate" or "oil volume" can be understood interchangeably by considering an oil volume for a given unit of time.

Thus, the measurement of a volume or flow rate is equivalent in consideration of the present invention and is not regarded as a restriction since either consideration leads to the claimed result.

Figure 1:
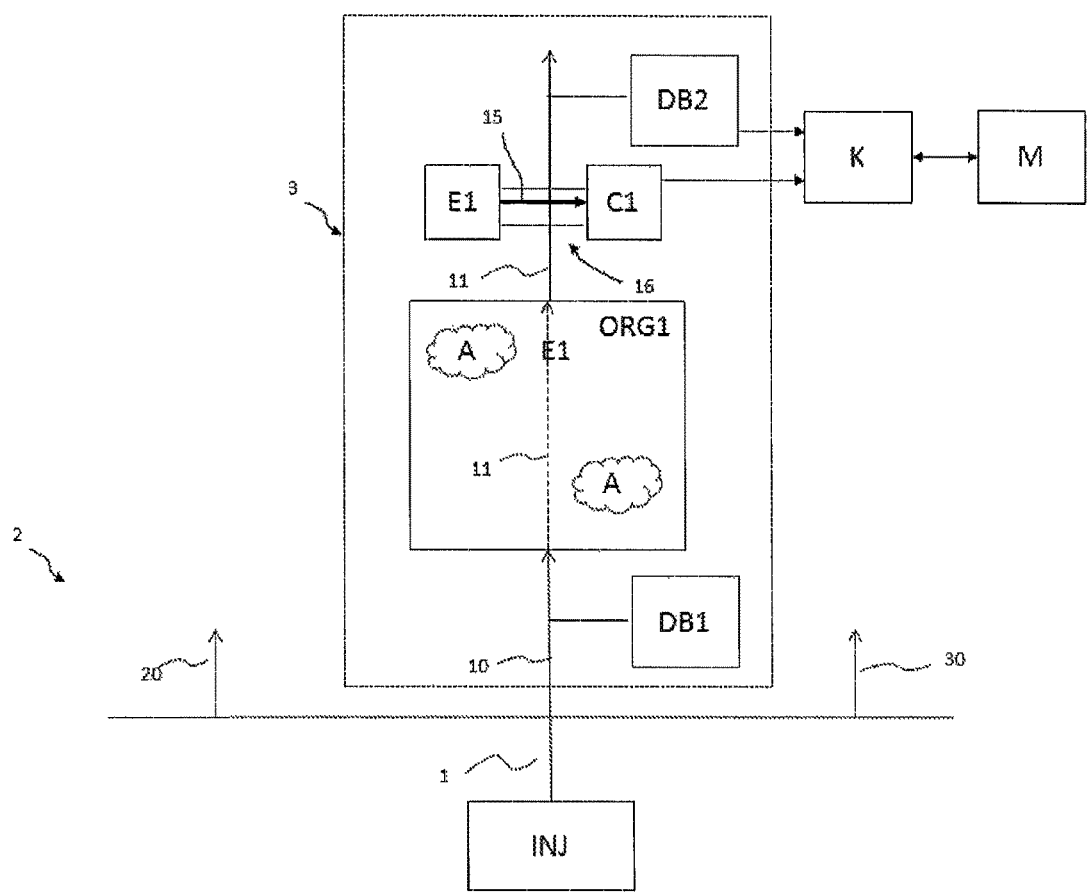
FIG. 1: a schematic diagram of the measuring system of the invention on a branch of a regulating circuit including a member.

FIG. 1 represents a portion 3 of a lubricating system 2 wherein an oil flow rate 1 is injected by means of an injector INJ. The system comprises different branches 10, 20, 30 in which the injected oil 1 is distributed. Neither the branches 20 and 30 are represented nor the general outlet of the system to which the different outlets of different branches led.

Each branch comprises at least one member; in the branch 10 represented in FIG. 1, a member ORG1 is represented. It can be an enclosure, an accessory box or even another element of the engine.

The invention aims at measuring the oil volume retained in the member ORG1. The entire oil retained in the lubricating system can be obtained by summing each oil volume retained in each member. Further, the total oil volume retained in the lubricating system can be also measured by another means such that those of prior art. It also possible to compare the results obtained by the method of the invention with those obtained by another method as regards the total volume for performing a correlation of the measurements. This approach allows to make sure of the results or to detect a measurement error. The invention also relates to this comparison step in an improved embodiment.

The measuring system of the invention is thus represented in FIG. 1. It comprises a first flowmeter DB1 which enables an oil volume 10 entering the member ORG1 to be measured on a given unit of time. At the flowmeter DB1, the injected oil is not mixed with air or if it is, the quantities will be too small such that the air volume at this level of the system is negligible.

Oil 10 penetrates the member ORG1 in which it is used for the lubrication thereof. In this step, oil is mixed with an air volume, noted A. Oil can be found depending on the members it traverses under different states. As air is sucked by an oil scavenger, the suction can also contribute to mixing oil and air. In the member ORG1, the fluid representing the oil-air mixture is called: the fluid 11.

There are two distinct modes wherein the system of the invention can be used.

A first mode corresponds to the transitory phase of the starting of the engine. During this transitory starting phase, the inflow and outflow rates of the member ORG1 will not be equal because there is more oil 10 which enters the member ORG1 than oil which outflows therefrom. The difference corresponds to the volume retained in the member ORG1. The measuring system of the invention precisely enables this retention volume to be measured.

The second mode corresponds to a stabilized operating mode, wherein the oil outflow rate is equal to the oil inflow rate. In this case, for given operating conditions, the retention volume in the member ORG1 is constant.

Figure 3:
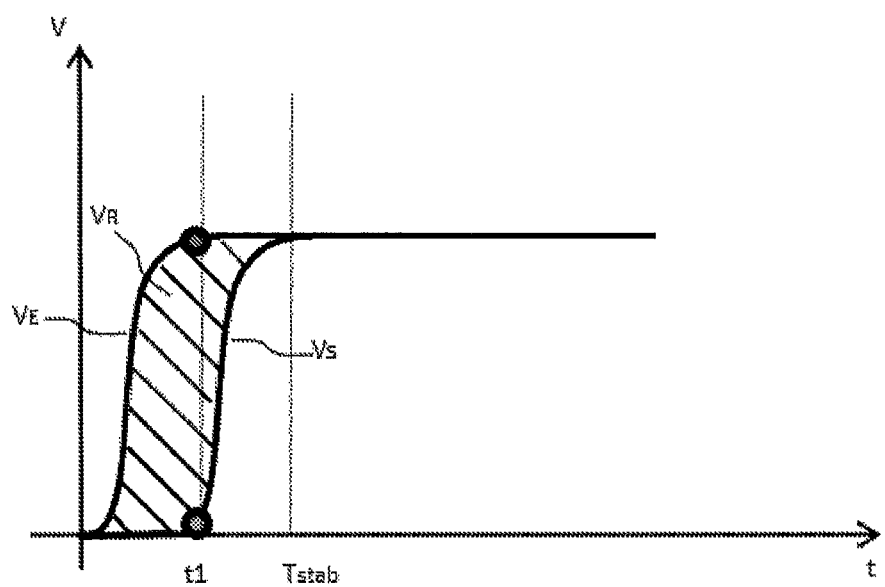
FIG. 3: a curve of the time course of the inflow and outflow volumes of a member of a lubricating system.

FIG. 3 illustrates the two curves of the time course in the inflow volume $V_E$ and the outflow volume $V_S$ in a member ORG1 in particular at start up, that is before the stabilisation phase from $T_{stab}$. It is understood that in this phase, the difference between the inflow volume $V_E$ and the outflow volume $V_S$ corresponds to the oil retention volume $V_R$.

The measuring system of the invention thus enables the inflow volume to be measured in the member and the inflow rate D1 to be known initially.

The measurement of the oil inflow volume 10 can be made from a flowmeter or a volumetric meter. This is possible because in the feed system at the inlet of the member ORG1, the fluid is "single-phase", it is pure oil or nearly pure oil, there is not the air/oil mixture which would bias the measurement of the pure oil flow rate yet.

By integrating the volume flow rate with respect to time, the measuring system of the invention enables the oil inflow volume to be deduced.

The measuring system of the invention further comprises at least one outlet flowmeter DB2 positioned at the outlet of the member ORG1. Each branch of the regulating circuit can be equipped with an outlet flowmeter. The outlet flowmeter DB2, according to one embodiment, can be a scavenge pump. The characteristics of each pump enable the fluid flow rate treated by the pump and thus the outflow rate of each member to be known. Further, a scavenge pump enables to facilitate the scavenging of oil flowing inside the member ORG1 while measuring the outflow rate D2 of this branch.

However, the fluid that circulates in the scavenge conduits is not pure or "nearly" pure oil, that is in close proportions, but an air/oil mixture comprising an air proportion being not negligible.

The fluid 11 comprises a non-negligible air volume on the one hand because the fluid that traverses the member is at the outlet in the form of an air/oil mixture and on the other hand because the scavenge pumps are dimensioned to avoid overload of the members and more particularly of the enclosures. Generally, in the lubricating systems of a turbomachine, the scavenge capabilities of such pumps ensure an air flow rate/oil flow rate ratio in the order of 1.5

The measuring system of the invention thus comprises a measuring device enabling a value representing a given quantity of oil in a given volume of the fluid at the outlet of the member ORG1 to be calculated. The value can represent a mass or volume indicator of the oil proportion in the fluid in a determined fluid volume.

An optical measuring device can be implemented in the measuring system of the invention. In this case, the optical measuring device comprises an emitter E1 enabling a light beam 15 to be generated through a transparent cavity 16 inside which the fluid flows, the beam traversing the cavity being then sensed by a sensor C1.

The cavity 16 can be a translucent conduit portion or a transparent transition tank. It is located at the outlet of the member ORG1. The fluid traversing the cavity 16 is then conveyed to an outlet to join the other fluid or oil fractions from the other members.

Figure 2:
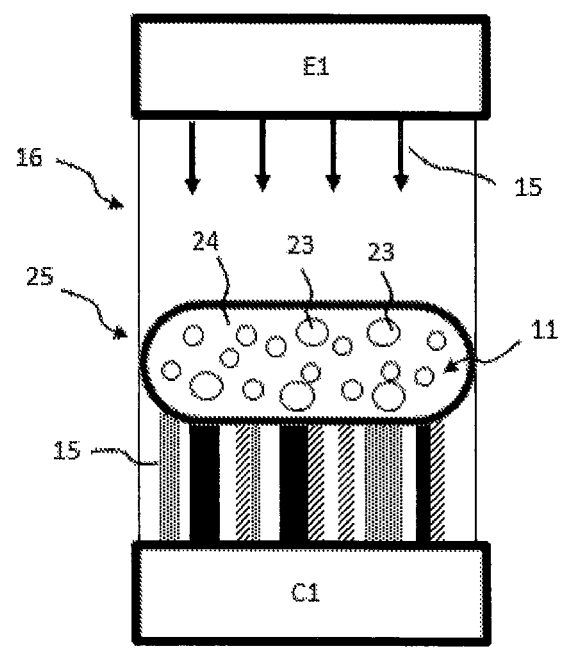
FIG. 2: an optical measuring device integrated into the system for measuring retention volumes.

FIG. 2 details one embodiment of an optical measuring device 16 in which a translucent conduit 25 enables the fluid 11 to be circulated, said fluid comprising air 24 and oil 23 represented as droplets.

The beam 15 is generated by the emitter E1 such that it traverses the translucent conduit 25. The translucent conduit 25 includes a height identical throughout the portion traversed by the light beam. The conduit includes a width enabling a sufficient analysis area to be obtained on the sensor C1 to extract exploitable data and some accuracy level for the measurements. The analysis of the signals received can be made on a sufficient portion of a sensor C1 that has received a light beam.

The signals 15 downstream the translucent conduit 25, that is after they have passed through the conduit 25, are differently represented in FIG. 2 than before they pass through the conduit, that is upstream.

According to the configuration of the optical device 16 and the type of light rays chosen, the rays received by the sensor C1 can be studied according to different parameters such as their light intensity or power, their phase or their polarization or even taking into account modified wavelengths.

It is preferred in the system of the invention to use materials not altering the signals or at least such that only the oil proportion in the fluid is the factor determining the analysis of variations observed of the light signals on the sensor C1.

In the same way, the shape of the cavity, thus of the conduit, must be chosen in an optimized way to promote an exploitation of the results representative of the oil proportions in the fluid. A sufficient analysis area on the sensor C1 enables a sufficient sample of received values to be collected and enables to avoid errors related to occasional fluctuations of the oil proportion in the fluid.

In particular, an oblong section of the conduit can be chosen. It offers two parallel surfaces facing each other and enables to have a sufficient sensing area.

The choice of a conduit including a planar surface on either side of the crossing path of the light ray is particularly advantageous. As represented in FIG. 2, it is noticed that light signals traverse the conduit along the same optical path and are then received on the sensor C1.

It is understood that a conduit including a section being oblong for example, or being rectangular according to another example, enables the undesirable effects of a circular conduit, for example, to be restricted. The latter would actually induce light path deviations on the entire apparent area of a cylinder.

After generating a light beam, the measuring device of the invention enables the quantity of light which has traversed the conduit to be measured using a photosensor C1.

The quantity of light received by the sensor depends on the nature of the fluid which traverses the transparent conduit, in particular in the application described, it depends on the air and oil proportion in the fluid. The quantities of light received can be different depending on whether the fluid is oil, a mixture of air and oil or simply air.

To calibrate the optical device, it is possible to calibrate the different responses of the photosensor C1 at different characterized configurations of the mixture and fluid flow rate.

For this, the optical device can be associated with a calculator K and a memory M. The memory M enables curves or calibration tables to be stored and the calculator K enables comparisons between the stored calibration values and values generated from the signals received by the sensor C1 to be performed.

The second flowmeter DB2 enables the flow rate of the fluid and thus of the mixture to be measured.

The analysis of the received signals and their correlation in real time enables the oil proportion in the fluid outflowing from each member to be known at each time.

As the flow rate of the fluid 11 is known thanks to the characteristics of each scavenge pump, that is the second flowmeter DB2, a calculator enables the flow rate and oil outflow volume contained in the fluid 11 to be calculated. Further, this calculator can be the same as the calculator K already described.

Two parameters can be taken into account together to refine the measurements of the sensor:
  the integration time of the beam on the sensor;
  the flow velocity of the fluid.

Thus, when the flowmeter DB2 measures the flow rate and thus the flow velocity of the fluid 11, two indicators can be exploited:
  a first indicator can be generated to the calculator K so as to choose a calibration table adapted to the fluid volume circulating in the translucent cavity;
  a second indicator enables to be taken into account in the frequency of the beam emitted and of the emission time slot.

In the transitory starting phase during which there is more oil that enters the member ORG1 than oil that outflows therefrom, the time course of the inflow $V_E$ and outflow $V_S$ volumes can be followed as a function of time in accordance with the representation of FIG. 3. The graph of FIG. 3 enables to highlight the resident oil volume $V_R$ in each member by measuring the area between both curves.

The starting transitory phase is defined in FIG. 3 up to the stabilization achieved at $T_{Stab}$. From the moment when the stabilization is achieved, that is after $T_{Stab}$, the outflow volume $V_S$ is identical to the inflow volume $V_E$. That is the oil volume retained in the member ORG1 is stable.

At each instant t1 of the transitory phase, that is at a moment before reaching $T_{Stab}$, the oil inflow volume is higher than the oil volume outflowing from the member, there is: $V_E(t1)>V_S(t1)$.

By integrating with respect to time the functions inflow $V_E$ and $V_S$ between t=0s and t=$T_{Stab}$, the retention volume $V_R$ of each member is obtained by difference. This volume corresponds to the area of the hatched zone in FIG. 3.

The system of the invention could operate according to alternative embodiments in particular on the choice of the measuring device enabling the oil quantity in the fluid at the outlet of the member ORG1 to be determined.

First, an optical measuring device could be chosen so as to generate waves in ranges other than visible light wave ranges.

Typically, the waves in the ultraviolet or near-visible infrared range seem to obtain good results also with the choice of an appropriate sensor.

The use of a source of amplified waves or a laser could be integrated into the measuring device of the invention.

Finally, according to embodiments, the light beam could be in the form of pulsed waves, that is light sequences are emitted during a time slot. It is important that the time slot during which the beam is generated is lower by a predetermined factor than the flow velocity of the fluid. This enables a homogeneous measurement of the fluid quantity to be obtained without the fluid movement altering the measurements.

In the same way, a spread or single frequency spectrum can be used according to different configurations of the optical measuring device.

Other non-optical measuring devices could be used but with integration difficulties. From the latter, a solution to measure the flow rate (and thus the volume) of outflow oil would be to use mass flowmeters such as a Coriolis flowmeter or even an electromagnetic flowmeter, each of which enables the quantity of oil in the air/oil mixture to be known.

On the other hand, an optical device is preferred as a preferred embodiment because the optical device is not subjected to the restrictions of a non-vibratory environment because of the turbomachine can vibrate in use.

Finally, the optical device overcomes the oil conductivity which could be a drawback according to the use of an electromagnetic flowmeter and the test conditions. This also prevents from having to fill the oil with conductive particles, which would substantially bias the results to obtain the retention oil volume.

However, the invention integrates these alternatives which could be employed.

The invention claimed is:

1. A system for measuring an oil retention volume of at least one first member of a lubricating system of an engine, an injected oil flowing inside the first member mixed with a first air volume, the mixture forming a first fluid, said measuring system comprising:
   an oil injector at an inlet of the lubricating system to feed said system;
   a first flowmeter to measure a first oil flow rate at the inlet of the lubricating system;
   a second flowmeter provided at an outlet of the first member, said second flowmeter to measure a second flow rate representing a flow rate of the first fluid at the outlet of the first member at a given instant;
   a measuring device enabling a first value to be calculated at a given instant representing a quantity of oil in a given volume of the first fluid flowing inside said first member, and
   a calculator configured to calculate:
      a third oil flow rate at the outlet of the first member from the second flow rate of the first fluid measured and the first value calculated;
      the oil retention volume in the first member from a comparison of the first oil flow rate with the third oil flow rate.

2. The system for measuring an oil retention volume according to claim 1, wherein the second flowmeter is a scavenge pump dimensioned to avoid overload of the first member of the system by determining a maximum air proportion admissible in the first fluid.

3. The system for measuring an oil retention volume according to claim 1, wherein the measuring device is an optical device comprising an emitter of a light beam traversing the first fluid passing through the first member and a photosensor enabling a quantity of received light to be measured.

4. The system for measuring an oil retention volume according to claim 3, further comprising a conduit including at least one translucent portion for conveying the first fluid through the optical device.

5. The system for measuring an oil retention volume according to claim 4, wherein the translucent portion of the conduit includes an oblong-shaped section.

6. The system for measuring an oil retention volume according to claim 3, further comprising a memory configured to store, for different outlet flow rates of the first member, calibration values, enabling reference values of a response of the photosensor to be associated with a set of reference mixtures of the first fluid, each mixture comprising different air proportions.

7. The system for measuring an oil retention volume according to claim 3, wherein the lubricating system comprises a plurality of members being traversed by a plurality of fluids having different oil and air proportions at a given instant, said system comprising, for each member traversed by a fluid from the injector, a first flowmeter, a second flowmeter and an optical device, such that retention volumes of each of the members are calculated and wherein the oil retention volume of the lubricating system is calculated by summing each of said retention volumes of each member.

8. The system for measuring an oil retention volume according to claim 1, wherein the measuring device comprises an emitter of a light beam traversing the first fluid passing through the first member and a photosensor enabling a quantity of received light to be measured.

9. The system for measuring an oil retention volume according to claim 8, wherein the measuring device comprises a conduit including at least one translucent portion for conveying the first fluid through an optical device including the emitter and the photosensor.

10. The system for measuring an oil retention volume according to claim 1, wherein the measuring device comprising a memory enabling the storage, for different outlet flows of the first member, of calibration values, enabling reference values of a response of the photosensor to be associated with a set of reference mixtures of the first fluid, each mixture comprising different air proportions.

11. A method for measuring a resident oil volume in a member of a lubricating system of an engine, said member being traversed by a fluid comprising a mixture of injected oil and air, said method comprising:

- injecting an oil volume at an inlet of said member by an injector;
- measuring an inflow rate of the oil volume in said member by a first flowmeter;
- generating a light beam by an emitter through a translucent portion of a conduit provided at an outlet of the member and conveying the fluid;
- receiving a signal generated by the emitter on a sensor, said signal having traversed the conduit conveying the fluid;
- comparing the signal received with a table of calibration values taking into account different oil proportions in a reference fluid by a calculator, said fluid comprising a mixture of air and oil, the values being stored in a memory;
- measuring a flow rate of the fluid at the outlet of the member by a second flowmeter;
- calculating a quantity of oil in a given volume of fluid outflowing from the member, and
- calculating a resident oil volume in the member.

12. A method for measuring a resident oil volume in a lubricating system of an engine, said system comprising a plurality of members each being traversed by a fluid injected by an injector, said fluid comprising a mixture of oil and air, the resident oil volume in each member being calculated according to the method of claim 11, said method comprising calculating the resident oil volume in the lubricating system by summing the resident oil volumes in each of said members.

* * * * *